Dec. 25, 1951  R. R. ROSS  2,579,966
RODENT TRAP
Filed June 12, 1946
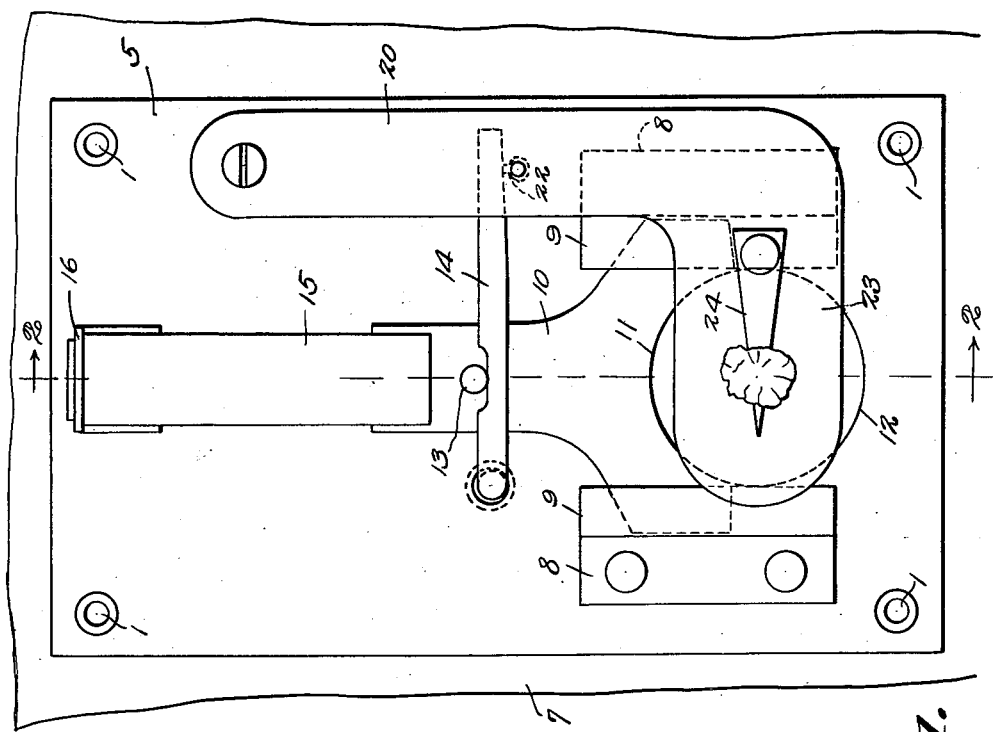
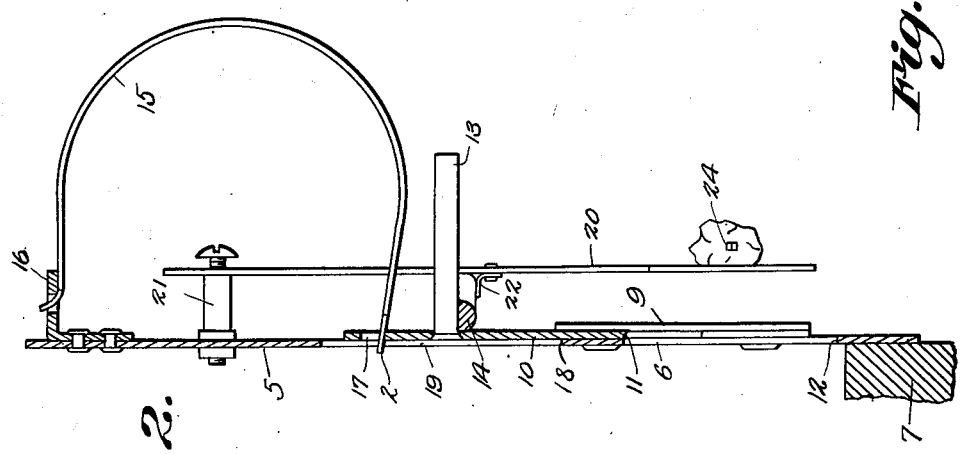
Inventor
*R. R. Ross*
By *Amondies*, Attorneys.

Patented Dec. 25, 1951

2,579,966

UNITED STATES PATENT OFFICE 2,579,966

RODENT TRAP

Roy R. Ross, Alexandria, Va., assignor of fifty per cent to Cecil F. Ross, Washington, D. C.

Application June 12, 1946, Serial No. 676,241

1 Claim. (Cl. 43—85)

This invention relates to traps designed for catching rodents.

The primary object of the invention is to provide a rodent trap which will be excessively sensitive in operation and one which will be cheap to manufacture.

Still another object of the invention is to provide a trap wherein the rodent will be caught by the neck and thereby quickly strangled.

Another object of the invention is to provide a rodent trap which may be readily set without danger of injury to the hands of the person setting the trap.

A further object of the invention is to provide a trap wherein the trap will be limited in its movement, to insure against injury to the finger of a child, if a child should attempt to operate the trap by pressing the trigger lever with his finger.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a rear elevational view of a trap constructed in accordance with the invention, the trap being shown as secured to an end wall of a box.

Figure 2 is a sectional view taken on the line 2—2 of Figure 1.

Referring to the drawings in detail, the trap embodies a supporting plate 5 which is formed with openings at its corners to receive securing screws 1, whereby the supporting plate may be secured to a vertical supporting surface.

The supporting plate 5 is formed with an opening 6 which provides the entrance opening to the trap, the opening 6 of the plate 5 being arranged so that it may be positioned to align with an opening in the supporting member 7, which may be in the form of a box, the plate 5 being secured to the rear surface of the supporting member 7 so that it will be concealed.

Guide plates 8 are secured to the rear surfaces of the supporting plate 5 and are formed with offset guide flanges 9 under which the sliding jaw 10 operates, the sliding jaw being formed with a curved lower edge 11 that is adapted to cooperate with the curved edge 12 of the entrance opening 6, which forms the stationary jaw of the trap.

Extending at right angles with respect to the sliding jaw 10 and carried by the sliding jaw is a pin 13 against which the pivoted arm 14 engages, the pivoted arm 14 having a right-angled end extended into an opening of the supporting plate 5.

The reference character 15 indicates a spring which is of the flat-steel type, the spring having one end thereof reduced and extended through an opening in the bracket 16 that is secured to the inner surface of the plate 5. The opposite end 2 of the spring 15 is also reduced and formed with shoulders, the reduced end being extended through the opening 17 in the jaw 10 at a point beyond the pin 13, the shoulders of the spring 15 adjacent to the reduced end, preventing movement of the reduced end of the spring through the opening 17 beyond a certain point. It might be further stated that these shoulders are so located that a length of the spring extends beyond the sliding jaw 10 to engage the shoulder 18 at one end of the slot 19, when the jaw moves to its closed position, thereby restricting movement of the jaw to prevent the curved edge thereof moving to a point adjacent to the curved edge 12, so that a small object positioned within the entrance opening will not be injured by the movable jaw moving to its closed position. Thus it will be seen that the end of the spring 15 extended beyond the jaw 10, acts as a stop for the jaw 10.

The trigger lever is indicated by the reference character 20, the trigger lever being pivotally supported on the post 21 that extends from the plate 5, the trigger lever 20 having a finger 22 that engages the pivoted arm 14 when the trap is set.

As shown by Figure 1 of the drawings, the lever 20 is formed with an end 23 that extends laterally therefrom, and is of a length to lie in front of the entrance opening 6 of the trap to guard the entrance opening.

Secured to the rear surface of the end 23 of the trigger lever, is a prong 24 on which the bait is held concealed from view to the rodent entering opening 6.

In the operation of the trap, a rodent attempting to gain entrance to the supporting member 7, which may be in the form of a box, to remove the bait, will cause the trigger lever 20 to be moved inwardly directly away from the pivoted arm 14, which has been moved to place the spring 15 under tension when the trap is set, as shown by Figure 1.

As the finger 22 is moved away from the arm 14, the sliding jaw 10 will be released to the action of the spring 15, which will cause the jaw to move into gripping relation with the lower edge of the entrance opening, gripping a rodent's neck therebetween.

Having thus described the invention, what is claimed is:

A rodent trap including a supporting plate having an entrance opening formed therein providing a jaw, adapted to be secured to a support having an opening in registry with the opening of the supporting plate, said supporting plate having a vertically elongated opening, a vertically sliding jaw mounted on the supporting plate and being movable over the opening of the plate, adapted to grip a rodent within the opening of the plate, said vertically sliding jaw having a transversely elongated opening formed therein, a spring member having one of its ends secured to the supporting plate, the opposite end of the spring being reduced and extended through the transversely elongated opening of said jaw securing the spring to said sliding jaw, a portion of said reduced end of the spring extending beyond the side surface of the jaw providing a stop adapted to engage one end of said vertically elongated opening, limiting downward movement of said vertically sliding jaw, and means including a trigger for releasing said movable jaw from a set position, adapted to trap a rodent entering said entrance opening of the trap.

ROY R. ROSS.

REFERENCES CITED

The following references are of record in the file of this patent:

UNITED STATES PATENTS

| Number | Name | Date |
|---|---|---|
| 365,763 | Swan | June 28, 1887 |
| 488,448 | Nelson | Dec. 20, 1892 |
| 996,599 | Harding | June 27, 1911 |
| 1,007,975 | Reese | Nov. 7, 1911 |
| 1,281,403 | Marcell et al. | Oct. 15, 1918 |
| 1,415,093 | Hurley | May 9, 1922 |
| 1,463,787 | Baldwin | Aug. 7, 1923 |
| 2,047,417 | Kalina | July 14, 1936 |
| 2,059,164 | Woods | Oct. 27, 1936 |